United States Patent [19]
Stine

[11] Patent Number: 5,907,974
[45] Date of Patent: Jun. 1, 1999

[54] SPLITTER LOCKOUT SYSTEM ARRANGED FOR CONVERSION BETWEEN FIRST AND SECOND OWNER CONFIGURATIONS

[75] Inventor: Alan C. Stine, Kalamazoo, Mich.

[73] Assignee: Eaton Corporation, Cleveland, Ohio

[21] Appl. No.: 09/069,611

[22] Filed: Apr. 29, 1998

[51] Int. Cl.⁶ .................................................. B60K 20/00
[52] U.S. Cl. ..................................... 74/473.21; 74/473.26
[58] Field of Search ........................... 74/473.21, 473.23, 74/473.26, 331

[56] References Cited

U.S. PATENT DOCUMENTS

| | | |
|---|---|---|
| 3,283,613 | 11/1966 | Perkins . |
| 4,462,489 | 7/1984 | Morscheck . |
| 4,754,665 | 7/1988 | Vandervoort . |
| 4,944,197 | 7/1990 | Stine et al. ...................... 74/473.26 X |
| 5,284,065 | 2/1994 | Loeffler et al. . |
| 5,642,643 | 7/1997 | Reynolds et al. .................... 74/331 |
| 5,737,978 | 4/1998 | Stine .................................. 74/325 X |

*Primary Examiner*—Khoi Q. Ta
*Attorney, Agent, or Firm*—Brooks & Kushman P.C.

[57] ABSTRACT

A compound transmission arranged for conversion between a first configuration without overdrive ratios and a second configuration for which multiple, additional overdrive ratios are provided disables engagement/disengagement of a splitter gear in the first configuration while allowing selective engagement of the splitter gear in the second configuration. The transmission includes an auxiliary transmission section having a splitter gear, a splitter/range gear, and a range gear. A range clutch is provided for selectively connecting either the splitter/range gear or the range gear to the output shaft, and a splitter clutch is provided for selectively connecting either the splitter gear or the splitter/range gear to the output shaft. A range control and splitter control are provided for positioning the range clutch and the splitter clutch, respectively. Without requiring significant disassembly and reassembly of the auxiliary transmission section, the splitter control may be converted from a first configuration in which engagement of the splitter clutch with the splitter gear is disabled, to a second configuration in which engagement of the splitter clutch with the splitter gear is enabled thereby providing multiple, additional overdrive ratios.

23 Claims, 6 Drawing Sheets

Fig. 5b ized to 5,907,974

SPLITTER LOCKOUT SYSTEM ARRANGED FOR CONVERSION BETWEEN FIRST AND SECOND OWNER CONFIGURATIONS

TECHNICAL FIELD

This invention relates to a compound transmission arranged for conversion between configurations which satisfy first and second owner needs.

BACKGROUND ART

Compound transmission systems comprising manually shifted multispeed main transmission sections connected in series with one or more multispeed auxiliary transmission sections, usually of the range, splitter, or combined range/splitter type are widely utilized in heavy duty vehicles. Examples of such compound systems may be seen by reference to U.S. Pat. Nos. 3,283,613 and 4,754,665; the disclosures of which are herein incorporated by reference. By utilizing main and auxiliary transmission sections connected in series, assuming proper sizing of the ratio steps, the total of available transmission ratios is equal to the product of the main and auxiliary section ratios.

For heavy equipment, such as trucks and tractors, traditional compound transmission systems have always compromised between addressing the operating needs of first and second owners. Typically, the first owner desires a low cost of operation with particular emphasis on fuel economy. As a result, the first owner would prefer a transmission with fewer speeds to always compromised between addressing the operating needs of first and second owners. Typically, the first owner desires a low cost of operation with particular emphasis on fuel economy. As a result, the first owner would prefer a transmission with fewer speeds to minimize skill level, a direct drive top gear to minimize power losses, and a geared cruise speed of 55–58 mph to minimize aerodynamic losses. This strategy is in conflict with a typical second owner, who places more value on performance than economy. The second owner would prefer a short step, overdrive transmission with a geared cruise speed of 65 mph. This conflict culminates in depressed resale values between the first and second owners.

In an attempt to provide a transmission which may be configured for both first and second owners, lockout devices have been utilized to prevent operation of the transmission by the first owner in a given combination of gear ratios. Upon resale, the lockout device is removed, thereby providing a full set of gear ratios for the second owner. Such lockout devices are normally enclosed within the transmission housing and cannot be removed or rendered inoperable without disassembling the entire transmission. U.S. Pat. No. 5,284,065 to Loeffler et al. discloses a lockout device which precludes the use of a single, overdrive top gear in the first owner configuration, and may be removed without transmission disassembly to provide the overdrive gear in the second owner configuration. While this device represents one solution, the availability of multiple, additional overdrive speeds in the second owner configuration would add further to the resale value of the vehicle between first and second owners.

Therefore, a need exists for a compound transmission which provides one set of gear ratios for the first owner of a vehicle, and may be converted to provide a plurality of additional gear ratios for the second owner of the vehicle without requiring disassembly and reassembly of significant portions of the transmission.

DISCLOSURE OF THE INVENTION

It is an object of the present invention to provide a compound transmission capable of serving the needs of both the first and second owners of a vehicle.

It is a further object of the present invention to provide a compound transmission that may be converted from a first owner configuration to a second owner configuration without requiring significant disassembly and reassembly of the transmission.

It is a still further object of the present invention to provide a compound transmission which provides a first set of gear ratios in a first owner configuration and a plurality of additional gear ratios in a second owner configuration.

Accordingly, a compound transmission is provided having a main transmission section and an auxiliary transmission section. The main transmission section includes an input shaft having an input gear rotatably mounted thereon, a mainshaft coaxial with the input shaft and having a plurality of mainshaft gears rotatably mounted thereon, and a main countershaft disposed parallel to the input and mainshafts and having a plurality of countershaft gears each in constant meshing engagement with one of the mainshaft gears or the input gear. Sliding clutches are provided for selectively connecting the mainshaft gears or the input gear, one at a time, to the mainshaft. The auxiliary transmission section includes an output shaft coaxial with the mainshaft, a splitter gear rotatably mounted on the mainshaft, a splitter/range gear rotatably mounted on the output shaft, and a range gear rotatably mounted on the output shaft. An auxiliary countershaft is disposed parallel to the output shaft and is provided with first, second, and third auxiliary countershaft gears mounted thereon and constantly meshed with the splitter gear, the splitter/range gear, and the range gear, respectively. A range clutch or clutches are provided for selectively connecting either the splitter/range gear or the range gear to the output shaft, and a clutch or clutches are provided for selectively connecting either the splitter gear or the splitter/range gear to the output shaft. A range control and splitter control are provided for positioning the range clutch and the splitter clutch, respectively. The splitter control may be converted from a first configuration in which engagement of the splitter clutch with the splitter gear is disabled, to a second configuration in which engagement of the splitter clutch with the splitter gear is enabled without requiring significant disassembly and reassembly of the auxiliary transmission section.

The above objects and other objects, features, and advantages of the present invention are more readily understood from a review of the attached drawings and the accompanying specification and claims.

BEST MODE FOR CARRYING OUT THE INVENTION

Figure 1:
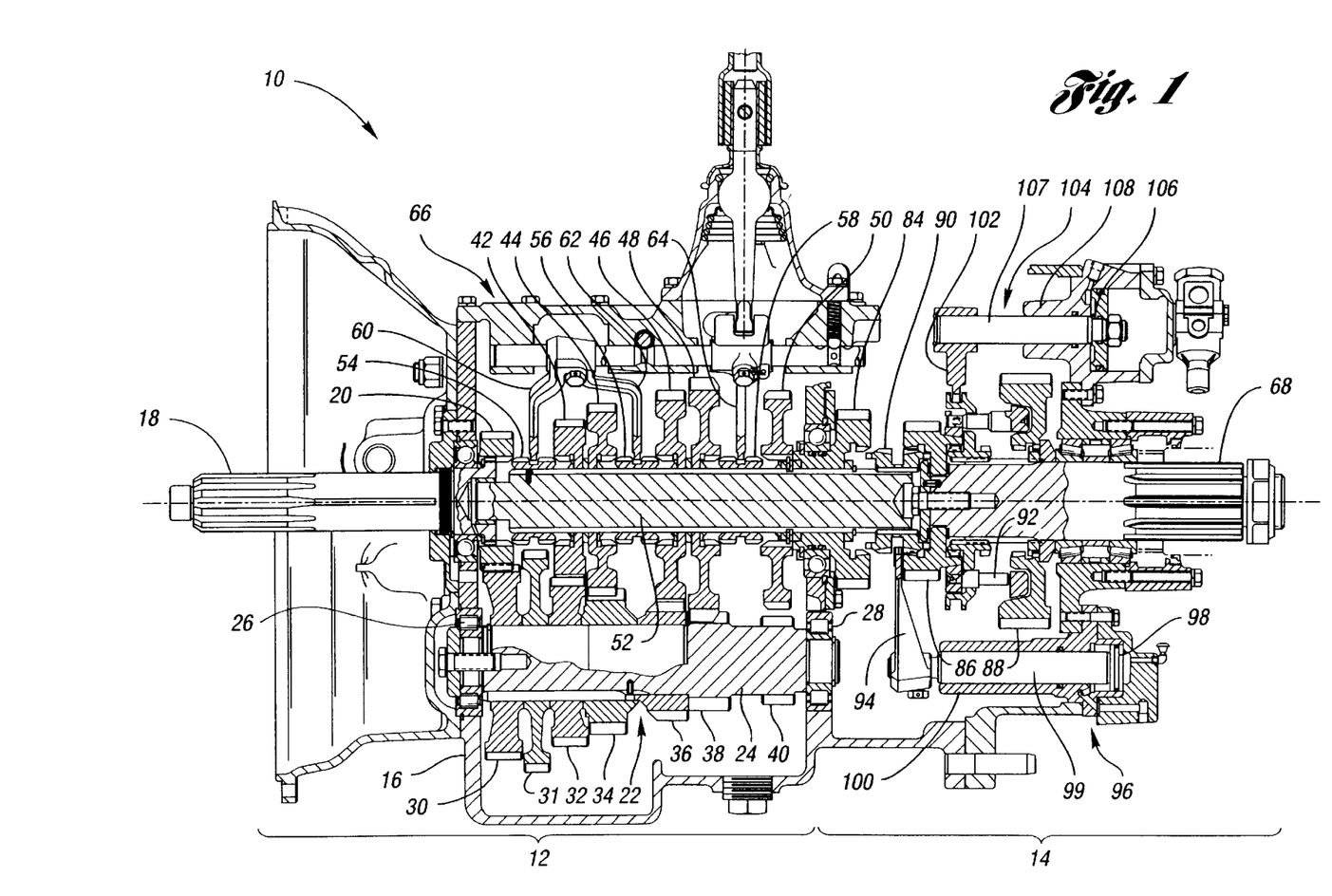
FIG. 1 is a side view, in section, of a compound transmission of the present invention.

Certain terminology will be used in the following description for convenience only and will not be limiting. The words "upwardly", "downwardly", "rightwardly", and "leftwardly" will designate directions in the drawings to which reference is made. The words "forward" and "rearward" will refer respectively to the front and rear ends of the transmission as conventionally mounted in the vehicle, being respectfully to the left and right sides of the transmission as illustrated in FIG. 1. This terminology includes the words above specifically mentioned, derivatives thereof, and words of similar import.

Referring now to FIG. 1, the compound transmission 10 is illustrated. Transmission 10 comprises a multiple speed main transmission section 12 connected in series with an auxiliary transmission section 14 having both range and splitter type gearing. Typically, transmission 10 is housed within a single multipiece housing 16 and includes an input shaft 18 driven by an engine, such as a diesel engine (not shown), through a selectively disengaged, normally engaged, friction master clutch (not shown).

In main transmission section 12, input shaft 18 carries an input gear 20 rotationally fixed thereto for driving at least one countershaft assembly 22. Countershaft assembly 22 comprises a main section countershaft 24 supported by bearings 26 and 28 in housing 16. Main section countershaft 24 is provided with main section countershaft gears 30, 31, 32, 34, 36, 38, and 40 fixed for rotation therewith. A plurality of mainshaft gears 42, 44, 46, 48, and 50 surround a transmission mainshaft 52 which is generally coaxially aligned with input shaft 18. Mainshaft gears 42–50 are selectively clutchable, one at a time, to mainshaft 52 for rotation therewith by clutch means such as sliding clutch collars 54, 56, and 58 as is well known in the art. Clutch collar 54 may also be utilized to clutch input gear 20 to mainshaft 52 to provide a direct drive relationship between input shaft 18 and mainshaft 52. Preferably, each of main section mainshaft gears 42–50 encircles mainshaft 52 and is in continuous meshing engagement with and is floatingly supported by the associated countershaft gear groups. Main section countershaft gear 31 is not meshed with an associated mainshaft gear, but rather is provided for powering power takeoff (PTO) devices and the like.

Typically, clutch collars 54, 56, and 58 are axially positioned by means of shift forks 60, 62, and 64, respectively, associated with a shift shaft (or shift bar) housing assembly 66. Clutch collars 54, 56, and 58 are, in a preferred embodiment, of the well known non-synchronized double acting jaw clutch type. Clutch collars 54, 56, and 58 are three-position clutches in that they may be positioned in a centered, axially non-displaced, non-engaged position as illustrated, or in a fully rightwardly engaged or fully leftwardly engaged position by means of a shift lever (not shown). As is well known in the art, only one of clutches 54, 56, and 58 is engageable at a given time and main section interlock means are provided to lock the other clutches in the neutral condition.

Figure 1A:
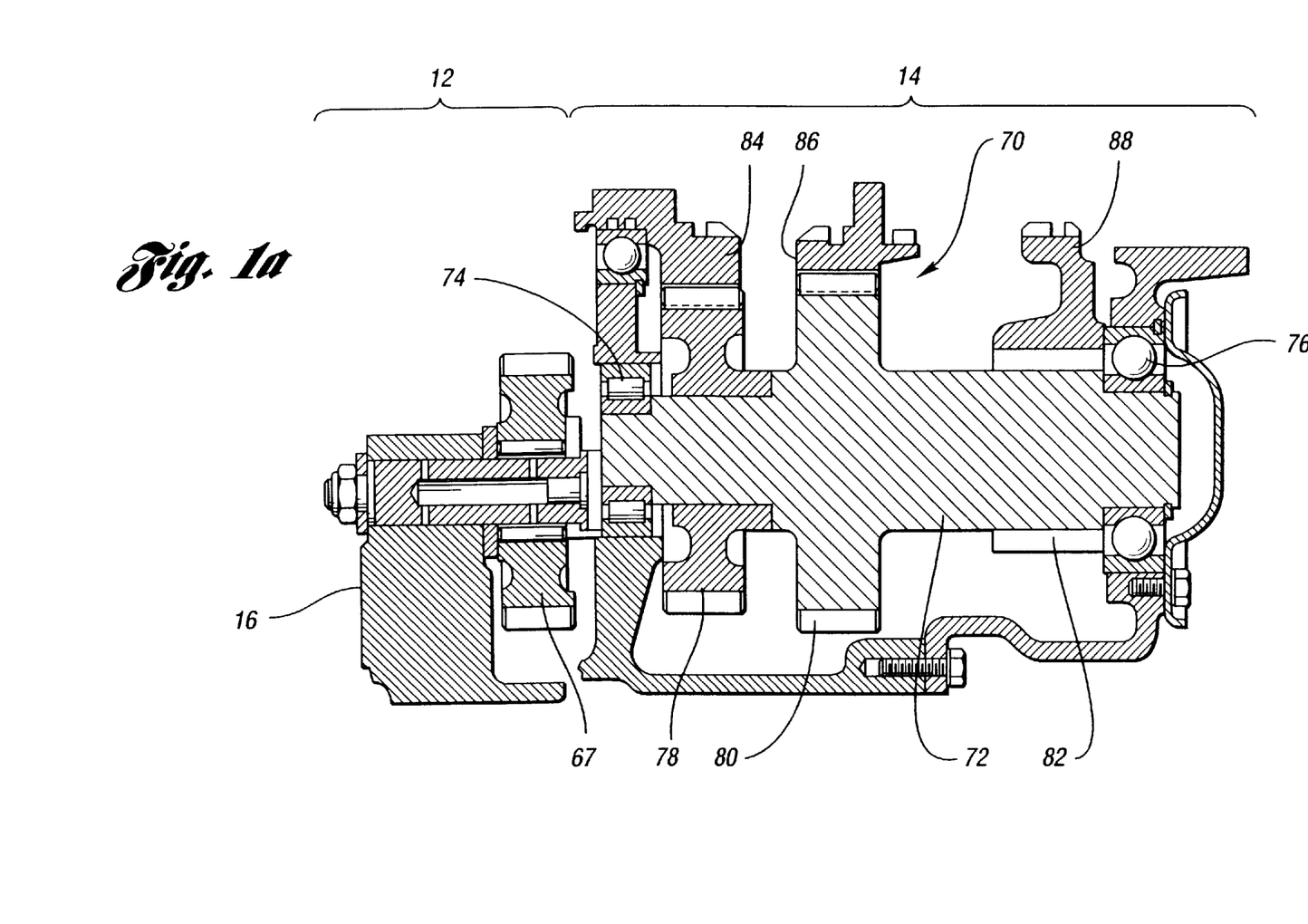
FIG. 1A is a partial view, in section, of an auxiliary countershaft assembly of the transmission of FIG. 1.

Main transmission section 12 preferably provides a reverse speed ratio and five selectable forward speed ratios, although it should be understood that a main transmission section having another number of forward speeds is acceptable. The first and lowest forward speed ratio is provided by drivingly connecting mainshaft gear 48 to mainshaft 52. The other four forward ratios, in descending order of reduction ratio (ascending speed) provided, are obtained by coupling gears 46, 44, 42, or 20 to mainshaft 52. Mainshaft gear 50 is the reverse gear and is in continuous meshing engagement with countershaft gear 40 by means of conventional intermediate idler gears 67 (FIG. 1A). The reverse speed ratio is provided by positioning clutch 58 to its fully rightward position to drivingly connect reverse gear 50 to mainshaft 52. Main transmission section 12 may be controlled by the operator by manually selectable gear shift mechanisms such as a gear shift lever. Of course, the present invention is equally applicable to automated and semi-automated mechanical transmissions.

Auxiliary transmission section 14 is connected in series with main transmission section 12 and is of the three-layer, four speed combined splitter/range type as illustrated in U.S. Pat. No. 4,754,665. Mainshaft 52 extends into auxiliary transmission section 14 and is journalled in the inward end of an output shaft 68 which extends from the rearward end of transmission 10. As shown in FIG. 1A, auxiliary transmission section 14 also includes at least one auxiliary countershaft assembly 70 comprising an auxiliary countershaft 72 supported by bearings 74 and 76 in housing 16 and carrying first 78, second 80, and third 82 auxiliary section countershaft gears fixed for rotation therewith. Referring again to FIG. 1, first auxiliary countershaft gear 78 is constantly meshed with and supporting an auxiliary section splitter gear 84. Second auxiliary countershaft gear 80 is constantly meshed with and supporting an auxiliary section splitter/range gear 86 which surrounds output shaft 68 at the end thereof adjacent the coaxial inner end of mainshaft 52. Third auxiliary section countershaft gear 82 is constantly meshed with and supporting an auxiliary section range gear 88 which surrounds output shaft 68. Accordingly, first auxiliary section countershaft gear 78 and splitter gear 84 define a first gear layer, second auxiliary section countershaft gear 80 and splitter/range gear 86 define a second gear layer, and third auxiliary section countershaft gear 82 and range gear 88 define a third gear layer of the combined splitter and range type auxiliary transmission section 14.

As shown in FIG. 1, splitter clutch means such as a sliding two-position jaw clutch collar 90 is utilized to selectively couple either splitter gear 84 or splitter/range gear 86 to mainshaft 52 while range clutch means such as a two-position synchronized clutch assembly 92 is utilized to selectively couple splitter/range gear 86 or range gear 88 to output shaft 68. The structure and function of splitter clutch 90 is substantially identical to the structure and function of sliding clutch collars 54, 56, and 58 utilized in main transmission section 12. The function of range clutch 92 is substantially identical to synchronized clutch assemblies of the prior art, an example of which may be seen by reference to U.S. Pat. No. 4,462,489 which is herein incorporated by reference. Range clutch 92 illustrated is of the pin-type described in U.S. Pat. No. 4,462,489.

Splitter clutch 90 may be selectively positioned in the rightwardmost or leftwardmost positions for engaging either gear 86 (split OFF) or 84 (split ON), respectively, to mainshaft 52. Splitter clutch 90 is axially positioned by means of a shift fork 94 controlled by splitter control means such as a 2-position splitter cylinder assembly 96. Splitter cylinder assembly 96 generally includes a piston 98 and connecting rod 99 slidably disposed within a cylinder 100, wherein rod 99 extends beyond cylinder 100 to engage shift fork 94 as is well known in the art. Range clutch 92 may be selectively positioned in either the rightwardmost or leftwardmost positions thereof for selectively clutching either gear 88 (LO range) or 86 (HI range), respectively, to output shaft 68. Range clutch 92 is positioned by means of a shift fork 102 controlled by range control means such as a two-position range cylinder assembly 104. Range cylinder assembly 104 generally includes a piston 106 and connecting rod 107 slidably disposed within a cylinder 108, wherein rod 107 extends beyond cylinder 108 to engage shift fork 98 as is well known in the art.

By selectively axially positioning both splitter clutch 90 and range clutch 92 in the forward and rearward axial positions thereof, four distinct drive ratios between mainshaft 52 and output shaft 68 are provided. Since one of the selectable main section forward gear ratios associated with mainshaft gear 48 (the creeper gear ratio) is not utilized in the HI range, compound transmission 10 is properly designated as a "(4+1)×(2×2)" type transmission providing thirteen or eighteen selectable forward speeds, depending on the desirability and practicality of splitting the LO range.

In a transmission according to the present invention, splitter 96 and range 100 Cylinder assemblies are interlocked to coordinate respective gear positioning. That is, when range clutch 92 is engaged with gear 86 (HI range), splitter clutch 90 may be shifted to engage either gear 86 (split OFF) or gear 84 (split ON). When range clutch 94 is engaged with gear 88 (LO range), splitter clutch 90 may only engage gear 86 (split OFF). This describes the second owner configuration of the present invention, wherein 5 LO range, 4 HI range, and an additional 4 overdrive (OD) ratios are provided for a total of 13 selectable forward speeds. In the first owner configuration of the present invention, splitter clutch 90 is disabled from engaging gear 84 in both the HI and LO range positions of range clutch 94, as will be described below, thereby providing just the 5 LO range and 4 HI range gear ratios for a total of 9 selectable forward speeds.

Gears L, 1, 2, 3, and 4 are the LO range, split OFF ratios provided for both the first and second owner configurations of the present invention. They are provided by locating splitter clutch 90 to its rightwardmost position and range clutch 92 to its rightwardmost position. The power path thus provided is from mainshaft 52 through splitter clutch 90 to splitter/range gear 86, up through second auxiliary countershaft gear 80 to auxiliary countershaft 72, down through third auxiliary countershaft gear 82 to range gear 88, and out through range clutch 92 to output shaft 68.

Gears 5, 6, 7, and 8 are the HI range, split OFF ratios provided for both the first and second owner configurations of the present invention. They are provided by moving range clutch 92 to its leftwardmost position and splitter clutch 90 to its rightwardmost position. The power path is from mainshaft 52 through splitter clutch 90 to splitter/range gear 86 to range clutch 92 and out through output shaft 68. Gear 8, the top gear for the first owner configuration, is a direct drive ratio which supports the fuel efficiency typically desired by the first owner.

In the second owner configuration, the HI range may be split, by moving splitter clutch 90 to its leftwardmost position, to provide overdrive ratios 5 OD, 6 OD, 7 OD, and 8 OD. The power path provided is from mainshaft 52 to splitter clutch 90 to splitter gear 84 up through first auxiliary countershaft gear 78 to auxiliary countershaft 72, down through second auxiliary countershaft gear 80 to splitter/range gear 86 to range clutch 92, and out through output shaft 68. The gear ratios for the forward speeds available in the first and second owner configurations are detailed in the table below.

| SPEED | RATIO |
|---|---|
| 8 OD | 0.85 |
| 8 | 1.00 |
| 7 OD | 1.18 |
| 7 | 1.39 |
| 6 OD | 1.64 |
| 6 | 1.94 |
| 5 OD | 2.28 |
| 5 | 2.70 |
| 4 | 3.78 |
| 3 | 5.26 |
| 2 | 7.34 |
| 1 | 10.20 |
| L | 14.71 |

Figure 2:
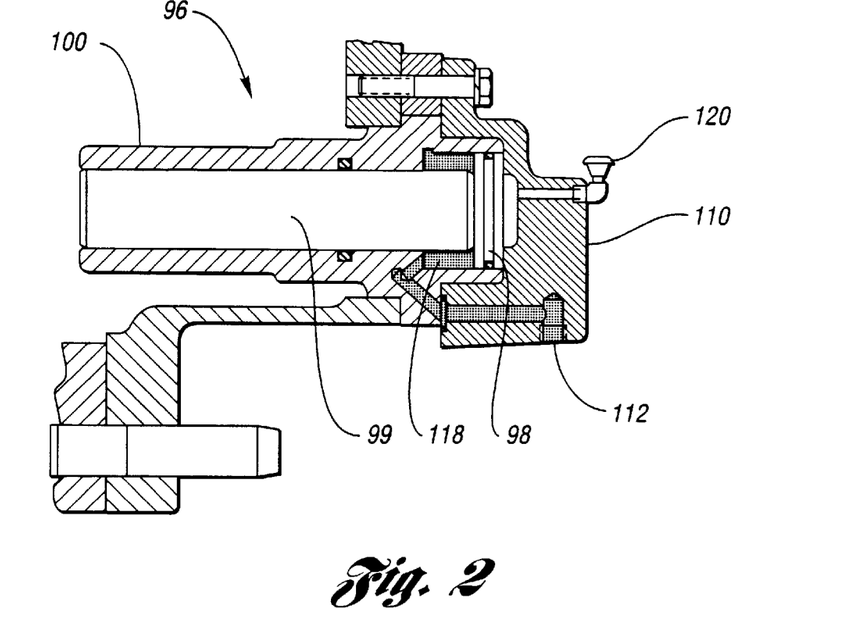
FIG. 2 is an enlarged, partial view of the splitter cylinder assembly utilized in a first owner configuration of the present invention.

The use of overdrive gears 5 OD–8 OD in the first owner configuration is prevented by assembling auxiliary transmission section 14 without the pneumatic elements to allow engagement of splitter gear 84. With reference to FIG. 2, splitter cylinder 100 is provided with a first splitter cylinder cover 110 in the first owner configuration. First splitter cylinder cover 110 is provided with a single port 112 into which fluid, typically air, is continuously supplied from a pressurized fluid source 117 through an air line 114 connected to the vehicle air filter/regulator assembly 116 (best shown in FIG. 4). Without any additional ports, air is allowed to flow only to the left chamber 118 of splitter cylinder 100, such that splitter piston 98 is forced rightward at all times, preventing the engagement of splitter gear 84. First splitter cylinder cover 110 is also equipped with a breather 120 which vents air from the right chamber 122 of splitter cylinder 100 to prevent pressure accumulation within right chamber 122 which might improperly urge splitter piston 98 leftward.

Figure 3:
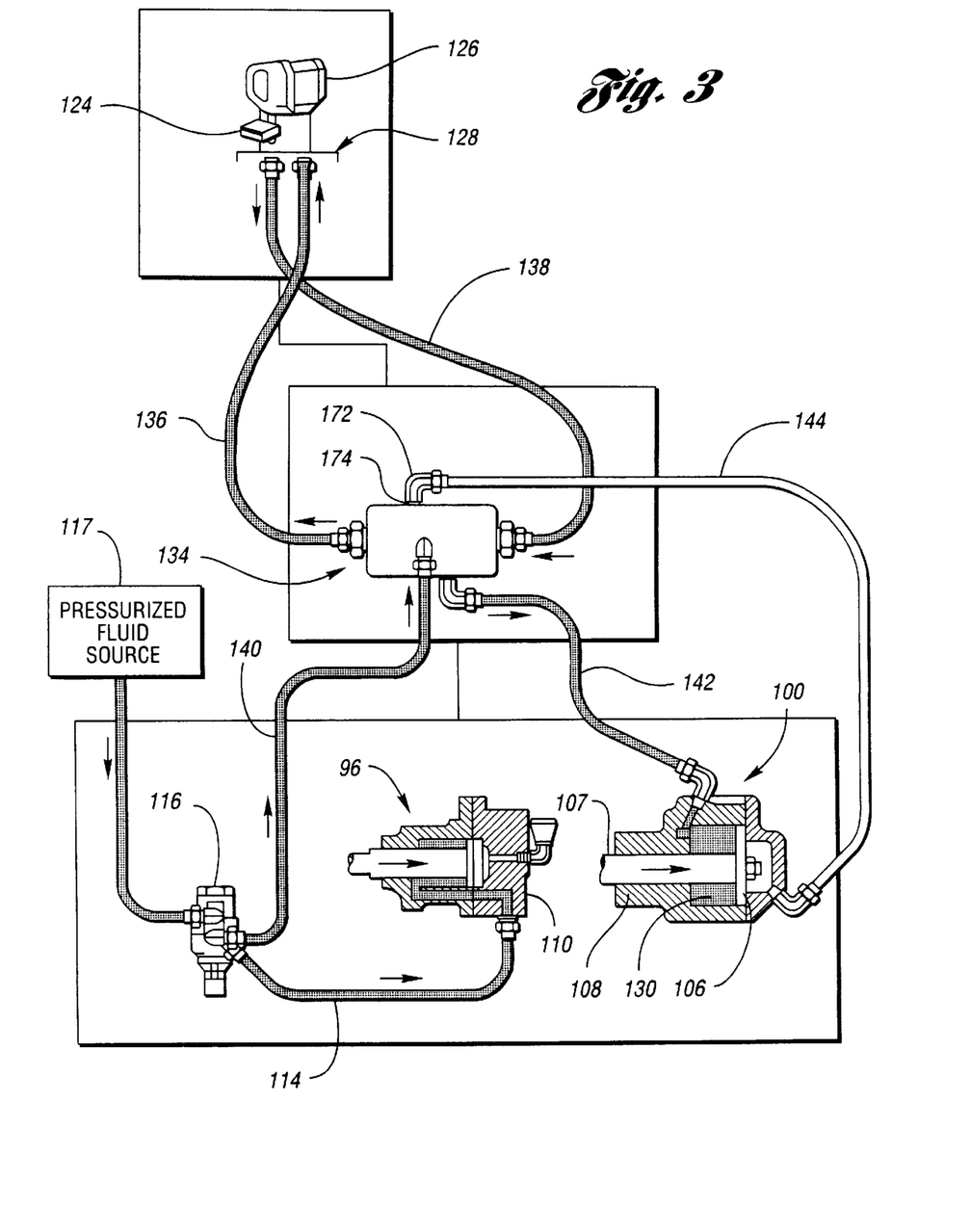
FIG. 3 is a schematic representation of the pneumatic elements for a first owner configuration of the present invention.

Referring now to FIG. 3, pneumatic elements for operation of range cylinder assembly 104 and splitter cylinder assembly 96 in the first owner configuration are shown. An operator-controlled switch 124, which is typically mounted on the main transmission section gear shift lever 126, is used to select the HI range or LO range gear ratios. By means of a first master valve 128 controlled by switch 124, fluid, typically air, is continually supplied to either a LO chamber 130 or a HI chamber 132 of range cylinder 108 as is well known in the art. A slave valve 134 provides air to first master valve 128 via supply line 136 and receives air from first master valve 128 via end line 138. Slave valve 134 receives air from air filter/regulator assembly 116 via air line 140, and provides air to LO chamber 130 and HI chamber 132 via LO range air line 142 and HI range air line 144, respectively. Thus, when LO range has been selected using switch 124, LO chamber 130 is pressurized via LO range air line 142, HI chamber 132 is exhausted via HI range air line 144, and range piston 106 is forced rightward as shown in FIG. 3. When HI range has been selected, the reverse occurs, and range piston 106 is forced leftward (best shown in FIG. 6).

Figure 4:
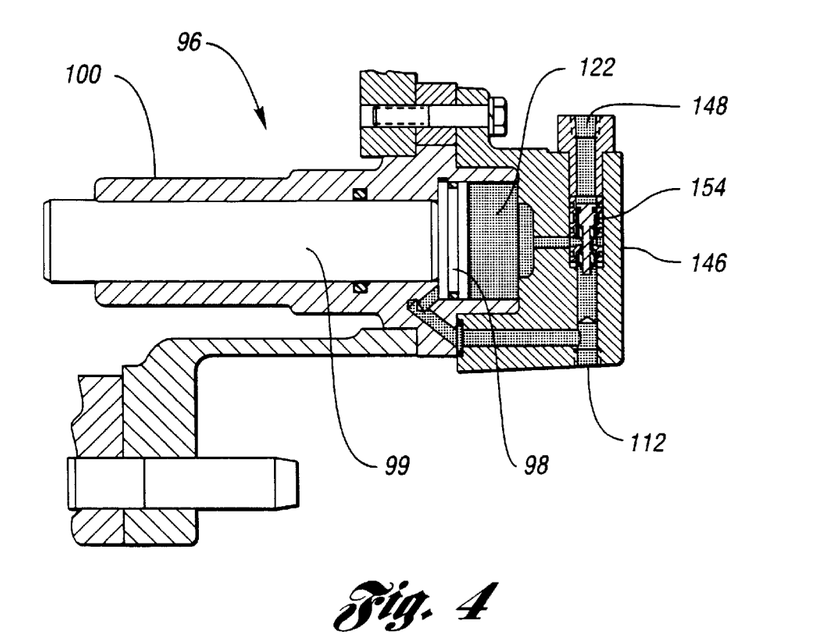
FIG. 4 is an enlarged, partial view of the splitter cylinder assembly utilized in a second owner configuration of the present invention.

In order to enable the engagement of splitter gear 84, additional pneumatic elements are provided to convert the transmission to the second configuration. Referring now to FIG. 4, first splitter cylinder cover 110 is replaced with a second splitter cylinder cover 146 for the second owner configuration. Second splitter cylinder cover 146 is again provided with port 112, and also an additional port 148 which receives air from a new, second master valve 150 via a splitter air line 152 (best shown in FIG. 6). An insert valve 154, described in greater detail below, is contained within second splitter cylinder cover 146 and regulates the air flow therethrough. Splitter cylinder assembly 96 is controlled by continuously applying pressure to left chamber 118, as described previously, and selectively pressurizing or depressurizing right chamber 122 as is well known in the art.

Figure 5A:
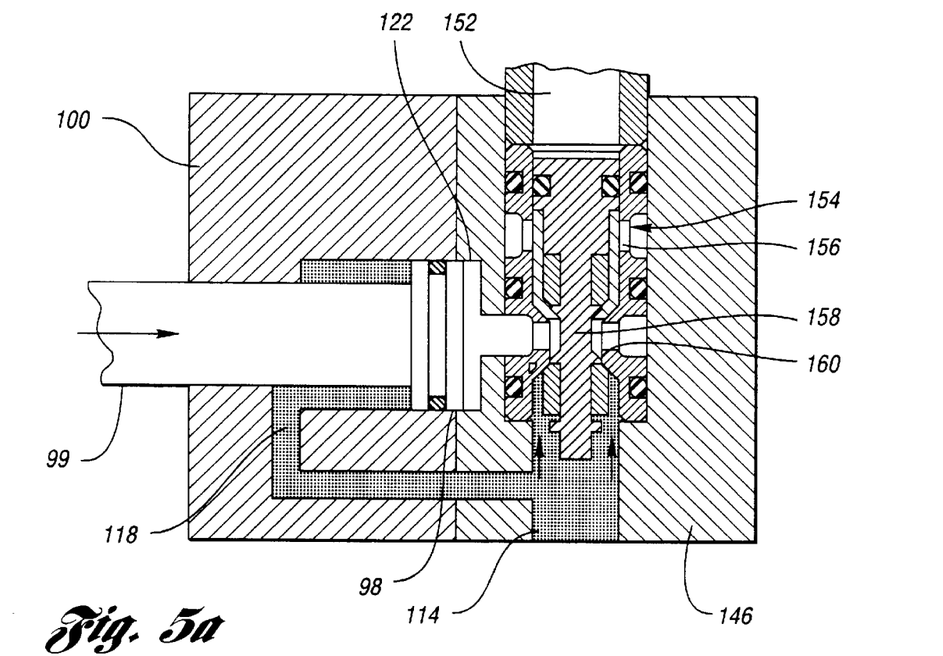
FIGS. 5A and 5B are enlarged views of the splitter cylinder cover utilized in a second owner configuration of the present invention.
Figure 5B:
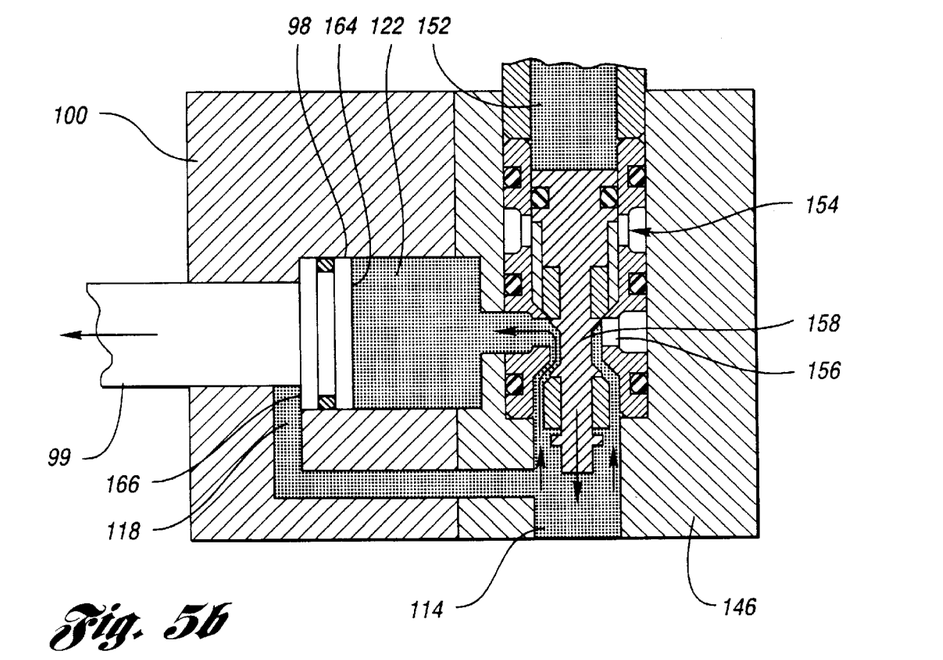

Referring now to FIGS. 5A and 5B, shown is an enlarged view of insert valve 154 contained within second splitter cylinder cover 146. Insert valve 154 comprises a sleeve 156 with a valve piston 158 slidably received therein. With reference to FIG. 5A, when no air is applied to valve piston 158 via splitter air line 152 (split OFF), constant air supplied from air filter/regulator assembly 116 via air line 114 is blocked from entering sleeve 156 at point 160. Therefore, air from air line 114 may only enter left chamber 118, such that splitter piston 98 is urged rightward. When air is applied to valve piston 158 via splitter air line 152 (split ON), as shown in FIG. 5B, valve piston 158 moves downward allowing air from air line 114 to enter right chamber 122 as well as left chamber 118. Since right surface 164 of splitter piston 98 presents a relatively larger area than left surface 166, when both lines 114 and 152 are pressurized splitter piston 98 will be urged leftward.

Figure 6:
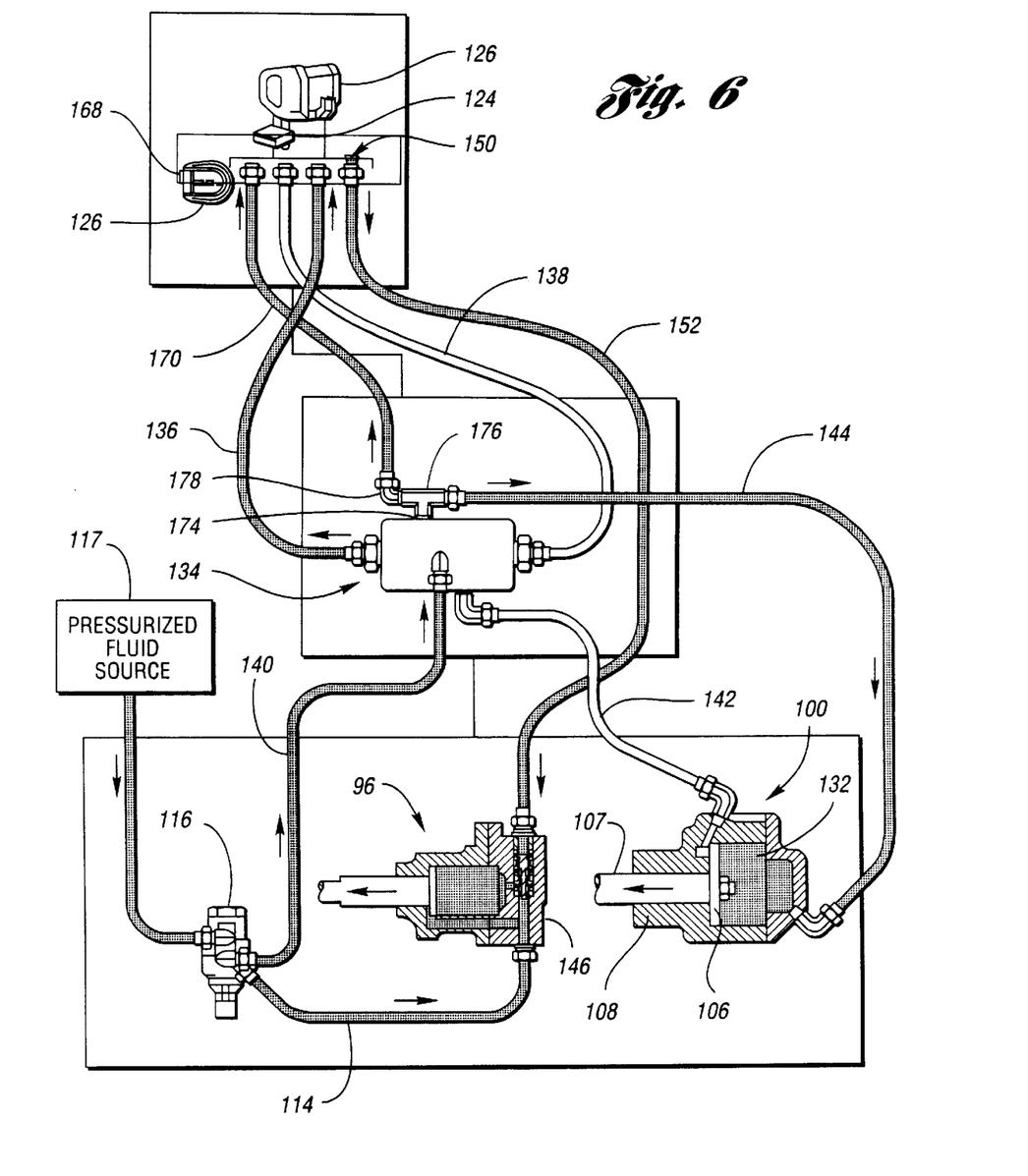
FIG. 6 is a schematic representation of the pneumatic elements for a second owner configuration of the present invention.

As shown in FIG. 6, splitter activation is controlled by a switch 168 which is typically mounted on main transmission section gear shift lever 126. Switch 168 is preferably provided as part of a conversion kit for the second owner configuration. However, a splitter switch may be provided, but disabled, in the original first owner configuration. For example, in an air over air control strategy using pneumatic control valves and a pneumatic actuation cylinder to engage and disengage the splitter gear, the splitter switch (valve) ON position may be disconnected or vented to atmosphere so it has no effect on the actuating cylinder. Alternatively, a "Y" connection could be used so that the splitter OFF control signal is generated regardless of the position of the splitter switch. Likewise, in a semi-automated or automated mechanical transmission where an electric over air or entirely electric control system is used, the splitter switch may have the ON and OFF position both connected to ground or to system voltage to disable operation of the splitter switch. Such an arrangement would inhibit any steady state voltage or current change based on the position of the splitter switch.

Alternatively, for semi-automated or automated mechanical transmissions, the transmission or powertrain controller may be programmed to "ignore" any change of input state of the splitter switch in the first configuration while generating an output to selectively control engagement/disengagement of the splitter gear in the second owner configuration. This may be accomplished by reprogramming the controller, by supplying a password, by changing one or more inputs (such as grounding or providing power to one or more discrete inputs to select an owner configuration) or the like. Of course, mechanical inhibiting means may also be provided alone or in combination with the electrical/pneumatic inhibiting means to provide additional redundancy.

In one embodiment of the present invention, to implement the second owner configuration, first master valve 128 is removed, and supply line 136 and end line 138 are disconnected therefrom. Air line 114 is disconnected from first splitter cylinder cover 110 and first splitter cylinder cover 110 is removed from splitter cylinder 100. Second splitter cylinder cover 146 is installed onto splitter cylinder 110, and air line 114 is connected to second splitter cylinder cover 146.

Next, second master valve 150 is installed, and supply air line 136, end air line 138, splitter air line 152, and a HI/LO air line 170 are connected thereto. At slave valve 134, HI range air line 144 is disconnected from the elbow 172 (best shown in FIG. 3) in port 174. Elbow 172 is removed and discarded, and a T fitting 176 is installed at port 174. HI range air line 144 is connected to one end of T fitting 176, and an air fitting 178 is installed into the other end of T fitting 176 onto which HI/LO air line 170 is connected. Lastly, splitter air line 152 is connected to second splitter cylinder cover 146.

As such, the present invention provides for conversion from an economy-driven first owner configuration to a performance-driven second owner configuration, providing a plurality of additional gear ratios. The conversion may be accomplished without significant disassembly and reassembly of the transmission typical of prior art configurations. In one embodiment, a simple retrofit of certain pneumatic elements provides a plurality of additional gear ratios to convert an economy-driven configuration to a performance-driven configuration.

It is understood, of course, that while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed.

What is claimed is:

1. A compound transmission comprising:
   a main transmission section and an auxiliary transmission section;
   the main transmission section having
      an input shaft for receiving power from an engine, the input shaft having an input gear rotatably mounted thereon;
      a mainshaft generally coaxial with the input shaft, the mainshaft having a plurality of mainshaft gears rotatably mounted thereon;
      at least one main countershaft disposed parallel to the input shaft and the mainshaft, the at least one main countershaft having a plurality of countershaft gears mounted thereon, each countershaft gear being in constant meshing engagement with one of the mainshaft gears or the input gear; and
      clutch means for selectively connecting the mainshaft gears or the input gear, one at a time, to the mainshaft;
   the auxiliary transmission section having
      an output shaft generally coaxial with the mainshaft;
      a splitter gear rotatably mounted on the mainshaft;
      a splitter/range gear rotatably mounted on the output shaft;
      a range gear rotatably mounted on the output shaft;
      at least one auxiliary countershaft disposed parallel to the output shaft, the at least one auxiliary countershaft having first, second, and third auxiliary countershaft gears mounted thereon and constantly meshed with the splitter gear, the splitter/range gear, and the range gear, respectively;
      range clutch means for selectively connecting either the splitter/range gear or the range gear to the output shaft;
      splitter clutch means for selectively connecting either the splitter gear or the splitter/range gear to the output shaft;
      range control means for positioning the range clutch means; and splitter control means for positioning the splitter clutch means, wherein engagement of the splitter clutch means with the splitter gear is disabled.

2. The compound transmission of claim 1, wherein the splitter control means is convertible to a configuration in which selective engagement of the splitter clutch means with the splitter gear is enabled.

3. The compound transmission of claim 2, wherein the range control means and the splitter control means are interlocked so that the splitter clutch means may not engage the splitter gear when the range clutch means is engaged with the range gear.

4. The compound transmission of claim 2, wherein positioning the range clutch means to connect the splitter/range gear to the output shaft and positioning the splitter clutch means to connect the splitter gear to the output shaft provides a set of overdrive ratios.

5. The compound transmission of claim 1, further comprising a manually selectable gear shift lever for positioning the clutch means in the main transmission section.

6. The compound transmission of claim 5, wherein the splitter control means is operated by a switch located on the shift lever, the switch having a first position in which engagement of the splitter clutch means with the splitter gear is prevented, and a second position in which engagement of the splitter clutch means with the splitter gear is allowed.

7. The compound transmission of claim 6, wherein communication of the second switch position with the splitter control means is disabled.

8. The compound transmission of claim 1, wherein the splitter control means comprises:

a splitter cylinder;

an axially positionable splitter piston disposed within the cylinder;

a rod connected to the splitter piston and extending from the splitter cylinder to connect to the splitter clutch means; and a splitter cylinder cover attached to the splitter cylinder.

9. The compound transmission of claim 2, wherein the splitter control means comprises:

a splitter cylinder;

an axially positionable splitter piston disposed within the cylinder;

a rod connected to the splitter piston and extending from the splitter cylinder to connect to the splitter clutch means; and a splitter cylinder cover attached to the splitter cylinder, the splitter cylinder cover being selected from a group consisting of:

a first splitter cylinder cover having a first port for attachment to a first fluid control means, and a second splitter cylinder cover having the first port attached to the first fluid control means and a second port for attachment to a second fluid control means.

10. The compound transmission of claim 9, wherein the first fluid control means includes an air filter/regulator assembly connected to a pressurized fluid source, the air filter/regulator assembly being provided with an air line attachable to the first port of the first and second splitter cylinder covers.

11. The compound transmission of claim 9, wherein the second fluid control means includes an operator actuated master valve selected from a group consisting of:

a first master valve connected to a pressurized fluid source; and a second master valve connected to the pressurized fluid source and provided with a splitter air line attachable to the second port of the second splitter cylinder cover.

12. The compound transmission of claim 9, wherein selection of the first splitter cylinder cover allows constant pressure applied by the first fluid control means to continuously urge the splitter piston in a first direction in which engagement of the splitter gear by the splitter clutch means is prevented, and selection of the second splitter cylinder cover allows an application of pressure by the second fluid control means to overcome the constant pressure applied by the first fluid control means to urge the piston in a second direction in which engagement of the splitter gear by the splitter clutch means is allowed.

13. The compound transmission of claim 9, wherein the splitter piston sealingly defines a first chamber adjacent a first surface of the splitter piston and a second chamber adjacent a second surface of the splitter piston within the splitter cylinder, wherein the surface area of the second surface is larger than the surface area of the first surface.

14. The compound transmission of claim 13, wherein the first splitter cylinder cover includes a breather which vents the second chamber of the splitter cylinder in order to prevent pressure accumulation within the second chamber.

15. The compound transmission of claim 13, wherein the second splitter cylinder cover further includes an insert valve, the insert valve comprising a sleeve and a valve piston which is axially movable within the sleeve, the insert valve functioning to regulate fluid flow into the first and second chambers of the splitter cylinder.

16. The compound transmission of claim 15, wherein pressure applied by the first fluid control means urges the valve piston in a first direction, allowing fluid to enter the first chamber and apply pressure to the first surface of the splitter piston, thereby forcing the splitter piston in a first direction, and pressure applied by the second fluid control means urges the valve piston in a second direction, allowing fluid to enter the first and second chambers and apply pressure to both the first surface and the second surface of the splitter piston, thereby forcing the splitter piston in a second direction due to the larger surface area of the second surface relative to the surface area of the first surface.

17. A method for converting a compound transmission having at least one splitter gear from a first configuration to a second configuration to provide a plurality of additional gear ratios in the second configuration, the method comprising:

disabling engagement of the splitter gear in the first configuration; and enabling selective engagement of the splitter gear in the second configuration.

18. The method of claim 17, wherein disabling operation of the splitter gear comprises:

biasing a splitter clutch toward a disengaged position.

19. The method of claim 17 wherein disabling operation of the splitter gear comprises fluidly biasing a splitter clutch toward a disengaged position.

20. The method of claim 17 wherein the compound transmission includes a switch for controlling operation of splitter control means, the switch having a first position in which engagement of the splitter clutch means with the splitter gear is prevented, and a second position in which engagement of the splitter clutch means with the splitter gear is allowed, wherein disabling operation of the splitter gear comprises:

disabling communication of the second switch position to the splitter control means.

21. The method of claim 20 wherein the switch is an electrical switch and wherein disabling communication comprises:

inhibiting a change in voltage output of the switch between the first and second positions.

22. The method of claim 20 wherein the switch includes an operatively associated valve and wherein preventing communication comprises:

inhibiting a change in fluid pressure supplied to the splitter control means between the first and second positions.

23. A method for converting an auxiliary transmission section of a compound transmission between a first configuration in which engagement of a splitter gear provided in the auxiliary transmission section is disabled, to a second configuration in which engagement of the splitter gear is enabled without requiring significant disassembly and reassembly of the auxiliary transmission section, the method comprising:

removing a first master valve, the first master valve being connected to a pressurized fluid source;

disconnecting an air line from a first splitter cylinder cover attached to a splitter cylinder, wherein the air line provides constant pressure from the pressurized fluid source to a first surface of a piston disposed within the splitter cylinder;

removing the first splitter cylinder cover from the splitter cylinder;

installing a second splitter cylinder cover onto the splitter cylinder;

connecting the air line to the second splitter cylinder cover;

installing a second master valve having a splitter air line, wherein the splitter air line is selectively actuated to apply pressure to a second surface of the piston;

connecting the splitter air line to the second splitter cylinder cover; and connecting the second master valve to the pressurized fluid source.

* * * * *